US011143323B2

(12) United States Patent
Lee

(10) Patent No.: US 11,143,323 B2
(45) Date of Patent: Oct. 12, 2021

(54) VALVE ASSEMBLY

(71) Applicant: DO QOOM, CORP, LTD, Gyeonggi-do (KR)

(72) Inventor: Sang Heon Lee, Seoul (KR)

(73) Assignee: DO QOOM, CORP, LTD., Gyeonggi-Do (KR)

( * ) Notice: Subject to any disclaimer, the term of this patent is extended or adjusted under 35 U.S.C. 154(b) by 216 days.

(21) Appl. No.: 16/306,196

(22) PCT Filed: May 31, 2017

(86) PCT No.: PCT/KR2017/005695
§ 371 (c)(1),
(2) Date: Dec. 26, 2018

(87) PCT Pub. No.: WO2017/209515
PCT Pub. Date: Dec. 7, 2017

(65) Prior Publication Data
US 2020/0149651 A1  May 14, 2020

(30) Foreign Application Priority Data

May 31, 2016  (KR) .................. 10-2016-0067360
May 31, 2017  (KR) .................. 10-2017-0067770

(51) Int. Cl.
*F16K 27/02*  (2006.01)
*F16K 15/06*  (2006.01)
(Continued)

(52) U.S. Cl.
CPC ........ *F16K 27/0209* (2013.01); *F16K 15/028* (2013.01); *F16K 15/063* (2013.01);
(Continued)

(58) Field of Classification Search
CPC .. F16K 27/0209; F16K 27/105; F16K 27/044; F16K 15/028; F16K 15/18
(Continued)

(56) References Cited

U.S. PATENT DOCUMENTS 227,943 A  *  5/1880  Wood .................... F16K 27/105
                                                    251/329
2,301,176 A     11/1942  Elliott
(Continued)

FOREIGN PATENT DOCUMENTS

CN        202280884        6/2012
CN        102563135        7/2012
(Continued)

OTHER PUBLICATIONS

International Search Report and Written Opinion issued in International Patent Application No. PCT/KR2017/005695, dated Sep. 28, 2017.
(Continued)

*Primary Examiner* — Umashankar Venkatesan
(74) *Attorney, Agent, or Firm* — Norton Rose Fulbright US LLP

(57) ABSTRACT

A valve assembly is disclosed. The valve assembly is installed between an inlet pipe and an outlet pipe through which a fluid is transferred, the valve assembly including: a valve body in which an inlet portion which is connected to the inlet pipe and through which the fluid is introduced, a space portion in which the fluid supplied to an inside of the valve body through the inlet portion stays, and an outlet portion which is connected to the outlet pipe and through which the fluid of the space portion is discharged to the outside are formed; and an opening and closing unit configured to open or close a path of the fluid by moving in a state of being in close contact with an inner surface of the (Continued)

valve body, wherein the valve body is formed of a pipe of a steel or stainless-steel material.

9 Claims, 8 Drawing Sheets

(51) Int. Cl.
  *F16K 27/10* (2006.01)
  *F16K 27/04* (2006.01)
  *F16K 15/02* (2006.01)
  *F16K 15/18* (2006.01)
(52) U.S. Cl.
  CPC .............. *F16K 15/18* (2013.01); *F16K 27/044* (2013.01); *F16K 27/105* (2013.01)
(58) Field of Classification Search
  USPC ...................................................... 251/77, 78
  See application file for complete search history.

(56) References Cited

U.S. PATENT DOCUMENTS

| | | | | |
|---|---|---|---|---|
| 2,352,799 | A * | 7/1944 | Newton | F16K 27/105 137/375 |
| 2,426,423 | A * | 8/1947 | Woolsey | F16L 17/04 285/233 |
| 2,914,083 | A * | 11/1959 | Cronkhite | F16K 15/18 137/496 |
| 3,070,112 | A * | 12/1962 | Fricke | B63C 7/10 137/102 |
| 3,779,280 | A * | 12/1973 | Evans | F16K 11/10 137/625.5 |
| 6,186,159 | B1 | 2/2001 | DeGood et al. | |
| 7,841,578 | B2 | 11/2010 | Ishigaki | |
| 8,678,348 | B1 * | 3/2014 | Cassel | F16K 1/10 251/223 |
| 10,371,309 | B2 * | 8/2019 | Gazave | F16L 59/141 |
| 10,712,065 | B2 * | 7/2020 | Goasguen | F01P 11/0204 |
| 2016/0033059 | A1 * | 2/2016 | Fonte | B23K 26/32 138/171 |

FOREIGN PATENT DOCUMENTS

| | | |
|---|---|---|
| CN | 203023513 | 6/2013 |
| DE | 8327689 | 5/1952 |
| JP | 2016075357 | 5/1916 |
| JP | 11141693 | 5/1999 |
| JP | 2009127726 | 6/2009 |
| JP | 2013210043 | 10/2013 |
| JP | 3196493 | 3/2015 |
| KR | 2016-0019134 | 2/1916 |
| KR | 2006-0008236 | 1/2006 |
| KR | 20070017343 | 2/2007 |
| KR | 2011-0007710 | 1/2011 |
| KR | 2011-0125536 | 11/2011 |

OTHER PUBLICATIONS

Extended European Search Report issued in corresponding application No. 17807008.2, dated Jan. 3, 2020.
Office Action issued in corresponding Japanese application No. 2018563147, dated Oct. 15, 2019.
Office Action issued in Corresponding Chinese Patent Application No. 201780042124, dated Aug. 2, 2019. (Machine Translation).

* cited by examiner

VALVE ASSEMBLY

CROSS-REFERENCE TO RELATED APPLICATIONS

This application is a national phase application under 35 U.S.C. § 371 of International Application No. PCT/KR2017/005695, filed May 31, 2017, which claims priority to and the benefit of Korean Patent Application Nos. 10-2016-0067360, filed May 31, 2016, and 10-2017-0067770, filed May 31, 2017. The contents of the referenced patent applications are incorporated into the present application by reference.

FIELD OF THE DISCLOSURE

The present invention relates to a valve assembly.

DESCRIPTION OF RELATED ART

Generally, valves refer to devices which control a flow rate, a flow velocity, a pressure, or the like of a fluid flowing through a pipe. The types of the valves include pressure valves, isolation valves, flow control valves, water flow valves, control valves, and the like, as well as check valves configured to flow a fluid only in one direction and block the flow in the opposite direction.

Referring to FIG. 10, a conventional valve includes a valve body 1 and an opening and closing unit configured to close or open a path of a fluid passing through the valve body 1.

More specifically, the valve body 1 includes an inlet portion 2 through which the fluid is introduced, a space portion 3 in which the fluid supplied to an inside of the valve body 1 through the inlet portion 2 stays, and an outlet portion 4 through which the fluid of the space portion 3 is discharged to the outside.

In addition, the opening and closing unit includes a stem 6 having one side positioned on the outside of the valve body 1 and the other side positioned on the inside of the valve body 1, a handle 8 installed on one side of the stem 6, and a disk 7 connected to the other side of the stem 6 to open or shield the inlet portion 2 or the outlet portion 4 while linearly moving in both directions.

Here, the conventional valve body is formed of cast-iron castings (hereinafter referred to as cast iron).

The inlet portion and the outlet portion of the valve body made of the cast iron are respectively connected to an inlet pipe and an outlet pipe, which are formed of steel pipes.

However, the valve body made of cast iron is vulnerable to temperature changes and impacts (internal hydraulic impacts and external impacts) and thus may be easily broken when the temperature changes are repeated.

Further, in the case of the valve body made of the cast iron, since the valve body is weak against water pressure, when the water pressure is increased, the thickness of the valve body must be increased in proportion to the water pressure.

Further, in the case of the valve body made of the cast iron, a connection method with the inlet and outlet pipes made of the steel pipe is limited to a connection method using flanges.

This is because the valve body made of the cast iron may not be welded together with the inlet and outlet pipes made of steel pipes, and it is difficult to form grooves or protrusions in the valve body made of the cast iron, and thus the valve body may not be connected to the inlet and outlet pipes even by a ring joint method or a groove joint method.

Accordingly, in the case of the conventional valve body made of the cast iron, since the valve body is bulky and heavy, and vulnerable to the temperature changes, the valve body may easily be broken and may be connected to the inlet pipe or the outlet pipe only through the flanges, which causes an increase in the number of work processes, thereby increasing working time and manufacturing costs.

SUMMARY OF THE INVENTION

One embodiment of the present invention provides a valve assembly in which a valve body is made of a steel pipe or a stainless-steel pipe, so that it is possible to provide the valve assembly which has reduced volume and weight and improved durability and is not easily broken or deformed in operation due to an increase in tensile strength and water pressure resistance as compared with a conventional valve body made of cast iron, and is capable of reducing manufacturing costs due to improved workability and a reduced manufacturing time as the valve body is connected to an inlet pipe and an outlet pipe in a simpler manner such as welding, ring joints, and groove joints. One aspect of the present invention provides a valve assembly which is installed between an inlet pipe and an outlet pipe through which a fluid is transferred, and includes: a valve body in which an inlet portion, a space portion, and an outlet portion are formed, wherein the inlet portion is connected to the inlet pipe and the fluid is introduced through the inlet portion, the fluid supplied to an inside of the valve body through the inlet portion stays in the space portion, and the outlet portion is connected to the outlet pipe and the fluid of the space portion is discharged to the outside through the outlet portion; and an opening and closing unit configured to open or close a path of the fluid by moving in a state of being in close contact with an inner surface of the valve body, wherein the valve body is formed of a pipe of a steel or stainless-steel material.

The valve body may be formed with an entrance portion in which the opening and closing unit is installed.

The valve body may include the inlet portion formed at one side thereof, the entrance portion formed at the other side thereof, and the space portion formed between the inlet portion and the entrance portion, and the inlet portion, the space portion, and the entrance portion may be disposed in a straight line.

The opening and closing unit may include a stem passing through a shielding member installed at the entrance portion, and a disk installed in the stem and slidably moving along a longitudinal direction of the stem in a state in which an outer circumferential surface thereof is in close contact with an inner circumferential surface of the inlet portion or the space portion.

Diameters of the inlet portion and/or the space portion may be the same in a movement section of the disk.

At least one of the inlet pipe, the valve body, and the outlet pipe may be formed by cutting a long steel pipe or a long stainless-steel pipe At least one of the inlet pipe, the valve body, the outlet pipe may be formed by rolling a steel plate or a stainless-steel plate into a cylindrical shape and welding a joint thereof.

Groove portions may be respectively formed at end portions of the valve body, in which the inlet portion and the outlet portion are formed, and one side end portions of the inlet pipe and the outlet pipe, and are recessed inward along circumferences of the end portions and the one side end portions, and the valve body may be connected to the inlet pipe and the outlet pipe using a joint ring fastened with bolts.

Protrusion portions may be respectively formed at end portions of the valve body, in which the inlet portion and the outlet portion are formed, and one side end portions of the inlet pipe and the outlet pipe, and protrude outward along circumferences of the end portions and the one side end portions, and the valve body may be connected to the inlet pipe and the outlet pipe using a joint ring fastened with bolts.

A gasket for sealing may be formed between the groove portions or between the protrusion portions, which are formed in the valve body, the inlet pipe, and the outlet pipe.

Each end portion of the valve body, in which the inlet portion and the outlet portion are formed, may be connected to the inlet pipe and the outlet pipe by welding.

Flanges may be respectively formed at end portions of the valve body, in which the inlet portion and the outlet portion are formed, and the inlet pipe and the outlet pipe, and the valve body and the inlet and outlet pipes may be connected to each other by fastening the flanges using bolts. In a valve assembly according to one embodiment of the present invention, a valve body is formed of a steel pipe or a stainless-steel pipe, thereby reducing the volume and weight and increasing durability.

Further, the valve assembly according to one embodiment of the present invention is not easily broken or deformed in operation due to an increase in tensile strength and water pressure resistance as compared with the conventional valve body made of cast iron, and is capable of reducing manufacturing costs due to improved workability and a reduced manufacturing time as the valve body is connected to the inlet pipe and the outlet pipe in a simpler manner such as welding, ring joints, and groove joints.

DETAILED DESCRIPTION OF THE INVENTION

Figure 1:
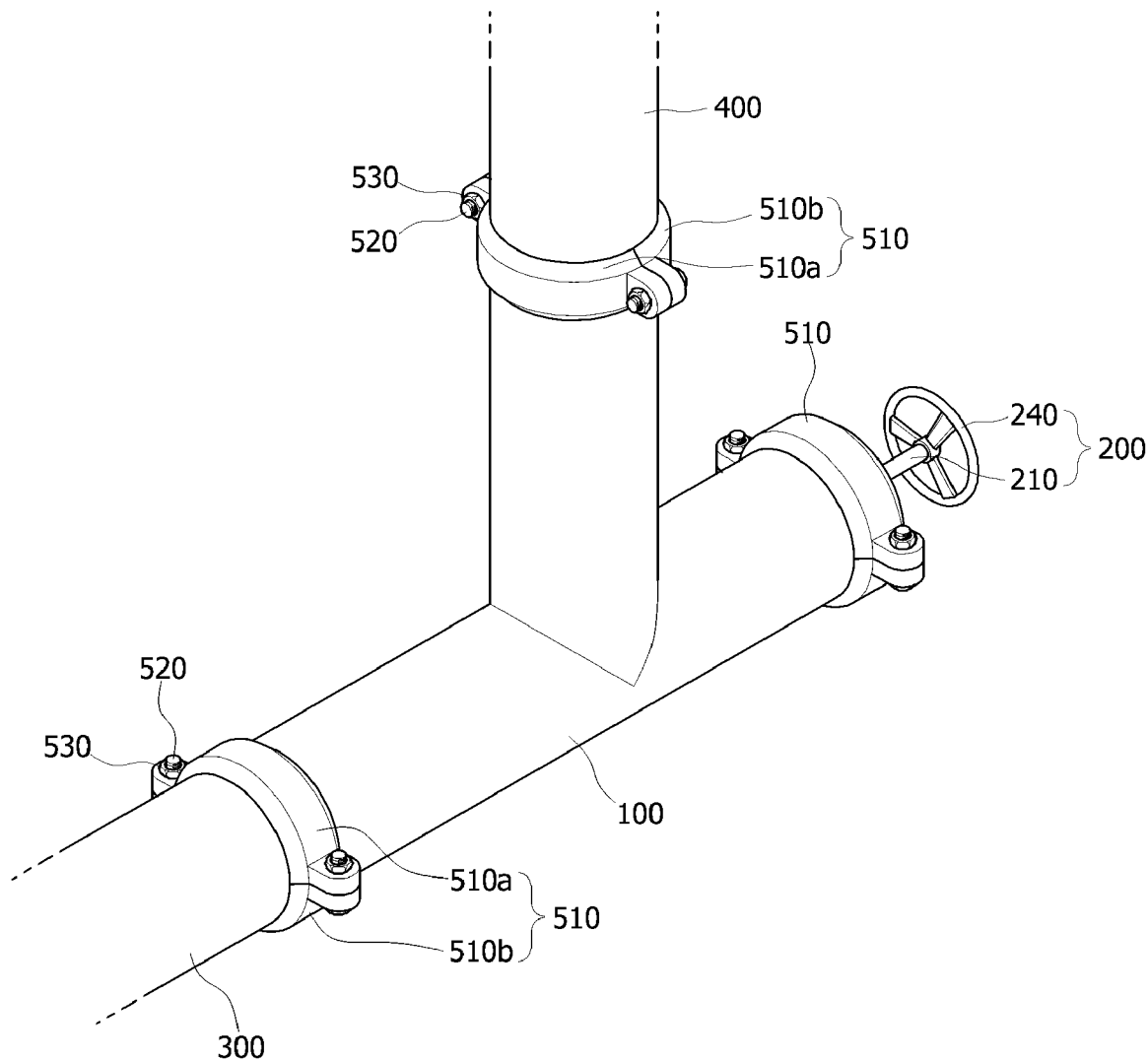
FIG. 1 is a perspective view of a valve assembly according to one embodiment of the present invention.

Hereinafter, exemplary embodiments of the present invention will be described in detail with reference to the accompanying drawings so that those of ordinary skill in the art can easily implement them. The present invention may be embodied in many different forms and is not limited to the embodiments set forth herein.

For clarity, a description of parts not related to describing the present invention is omitted here, and the same reference numerals are allocated to the same or similar components throughout the disclosure.

Components having the same structure in various embodiments will be allocated the same reference numeral and explained only in a representative embodiment, and components which are different from those of the representative example will be described in the other embodiments.

As used herein, when an element is referred to as being "connected to" another element, the element can be directly connected to the other element or be indirectly connected to the other element having an intervening element therebetween. In contrast, when an element is referred to as being "directly on" another element or layer, there are no intervening elements or layers present. It will be understood that the terms "comprise" and/or "comprising," when used herein, specify the presence of stated elements but do not preclude the presence or addition of one or more other elements unless mentioned otherwise.

Hereinafter, a valve assembly according to one embodiment of the present invention will be described in detail with reference to the drawings. Further, it should be noted in advance that the valve assembly of the present invention may include pressure valves, isolation valves, flow control valves, water flow valves, control valves, and the like as well as check valves.

FIG. 1 is a perspective view of a valve assembly according to one embodiment of the present invention.

Referring to FIG. 1, the valve assembly according to one embodiment of the present invention is installed between an inlet pipe 300 and an outlet pipe 400, through which a fluid is transferred, and may include a valve body 100 and an opening and closing unit 200.

Figure 2A:
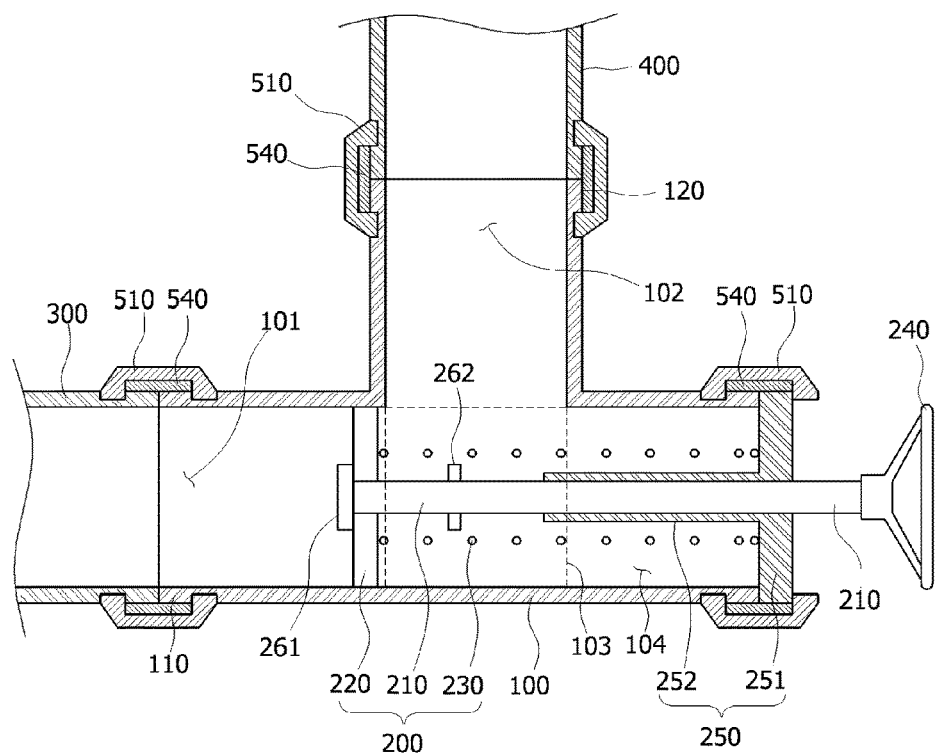
FIGS. 2A and 2B and FIGS. 3A and 3B are cross-sectional views of the valve assembly according to one embodiment of the present invention.
Figure 2B:
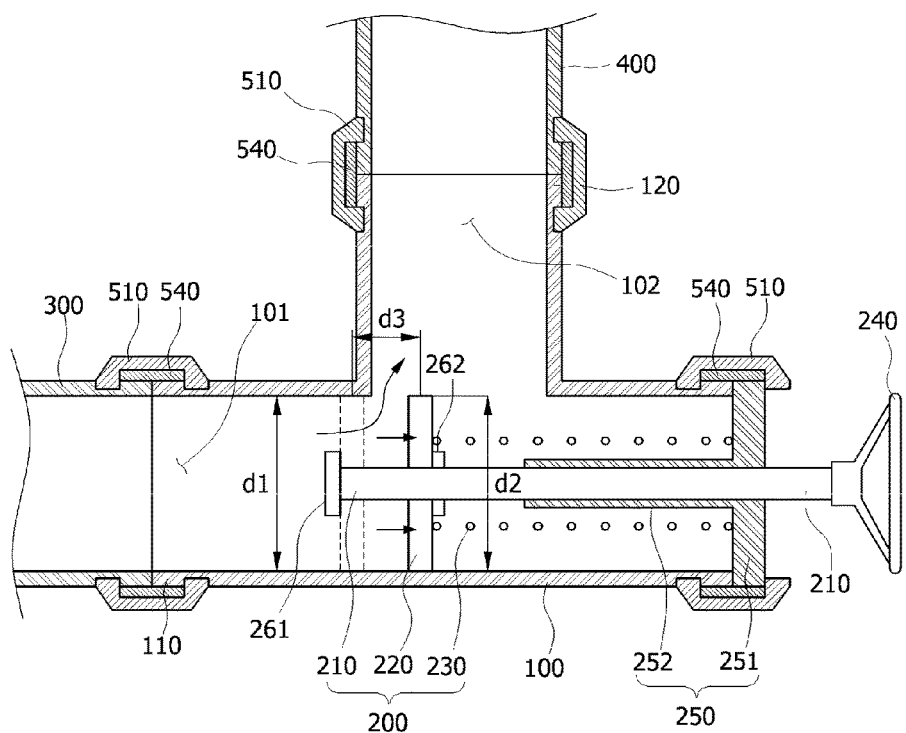

FIGS. 2A and 2B and FIGS. 3A and 3B are cross-sectional views of the valve assembly according to one embodiment of the present invention. More specifically, FIG. 2A illustrates a state in which a disk 220 of the opening and closing unit 200 is disposed in an inlet portion 101 before the fluid is supplied into the valve body 100 through the inlet portion 101, and FIG. 2B illustrates a state in which the fluid is supplied into the valve body 100 through the inlet portion 101 and the disk 220 of the opening and closing unit 200 is moved by a fluid pressure of the fluid to be disposed in a space portion 103.

Figure 3A:
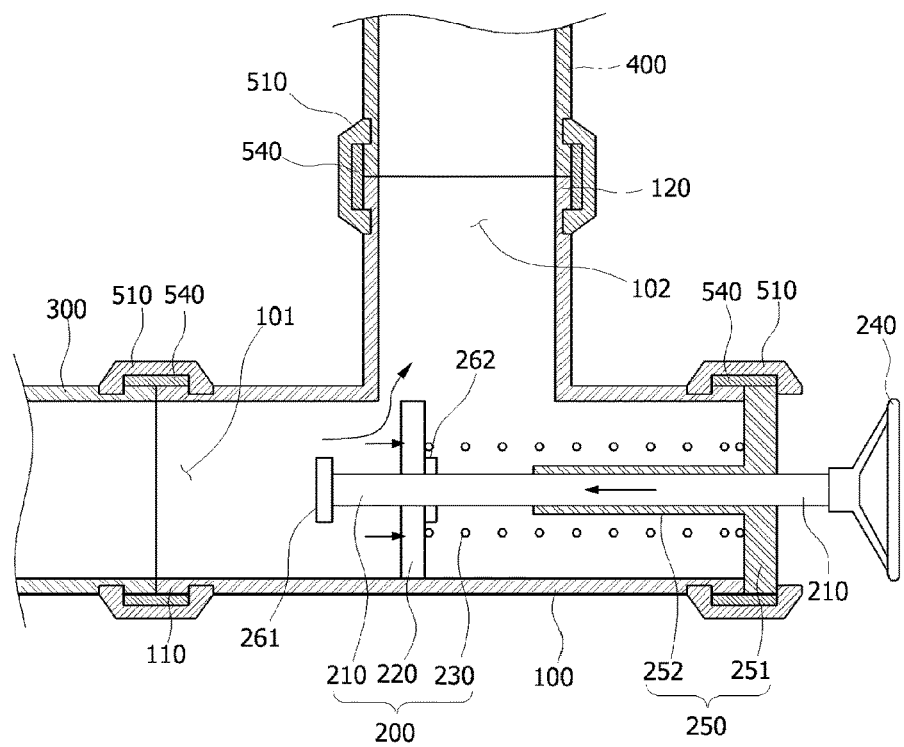
Figure 3B:
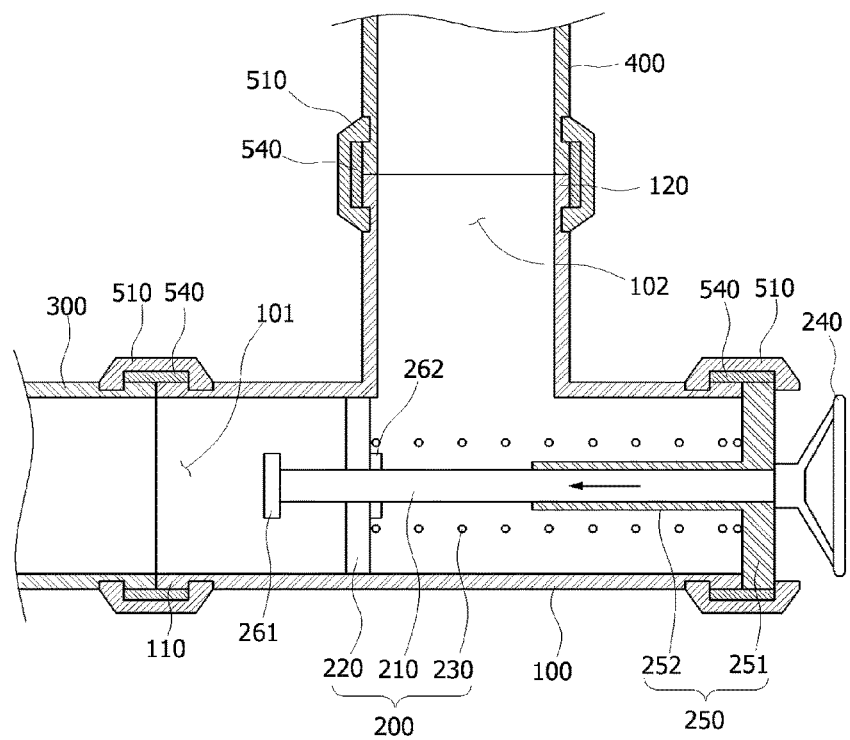

In addition, FIG. 3A illustrates a state in which a handle 240 is rotated to adjust a position of a second stopper 262 and adjust a movement amount of the disk 220 by the fluid pressure before the fluid is supplied into the valve body 100 through the inlet portion 101, and FIG. 3B illustrates a state in which the second stopper 262 is brought into close contact with the disk 220 by rotating the handle 240 to prevent the movement of the disk 220 by the fluid pressure before the fluid is supplied into the valve body 100 through the inlet portion 101.

Referring to FIGS. 2A to 3B, the valve body 100 may include the inlet portion 101 connected to the inlet pipe 300 and through which the fluid is introduced, the space portion 103 in which the fluid supplied to an inside of the valve body 100 through the inlet portion 101 stays, and an outlet portion 102 connected to the outlet pipe 400 and through which the fluid in the space portion 103 is discharged to the outside.

Thus, the fluid transferred to the inlet pipe 300 is introduced into the valve body 100 through the inlet portion 101 and is discharged out of the valve body 100 through the outlet portion 102 after passing through the space portion 103. Here, the fluid discharged through the outlet portion 102 is transferred along the outlet pipe 400.

The valve body 100 may include an entrance portion 104 provided with the opening and closing unit 200, and the inlet portion 101 may be formed at one side of the valve body 100 and the entrance portion 104 may be formed at the other side of the valve body 100. In addition, the space portion 103 may be formed between the inlet portion 101 and the entrance portion 104, and the outlet portion 102 may be connected to the space portion 103.

That is, the inlet portion 101, the space portion 103, and the entrance portion 104 are an integrated pipe arranged in a straight, and the outlet portion 102 may be formed as another pipe vertically connected to a side surface of the pipe.

Accordingly, a stem 210 may be configured such that a length of the stem 210 exposed to the outside of the valve body 100 is short by disposing the stem 210 of the opening and closing unit 200, which will be described below, in the straight line of the inlet portion 101, the space portion 103 and the entrance portion 104, thereby obtaining an effect in which the entire valve may be formed compactly.

A shielding member 250 is installed in the entrance portion 104 to prevent the fluid staying in the space portion 103 from being discharged to the outside through the entrance portion 104, and a side surface of the shielding member 250 comes into close contact with an end portion of the entrance portion 104.

The shielding member 250 shields the entrance portion 104 in a normal state but may be separated from the entrance portion 104 for discharging the fluid housed in the valve body 100 to the outside in an emergency, supplying the fluid from the outside, or for maintenance of the opening and closing unit 200.

Examples of the shape of the valve body 100 may vary. First, the valve body 100 may have both sides at which the inlet portion 101 and the outlet portion 102 are disposed to face each other, and in this case, the valve body 100 may be formed in a straight (−) shape or a cross (+) shape.

Further, the inlet portion 101 and the outlet portion 102 of the valve body 100 may be disposed perpendicular to each other, and in this case, the valve body 100 may also be formed in an "inverted and reversed L" shape or a "T" shape and the cross (+) shape. In addition, the valve body 100 may be formed in various shapes including a 'Y' shape.

In the embodiment, at least one of the inlet pipe 300, the valve body 100, and the outlet pipe 400 may be formed of a pipe of a steel or stainless-steel material.

A conventional valve body is made of cast-iron castings (hereinafter referred to as cast iron).

The conventional valve body made of the cast iron is vulnerable to temperature changes and thus may be easily broken when the temperature changes are repeated, and is weak against water pressure, and thus, when the water pressure is increased, a thickness thereof is increased in proportion to the water pressure.

Further, a connection method with the inlet and outlet pipes formed of a steel pipe is limited to a connection method using the flange.

However, in the valve assembly according to one embodiment of the present invention, the valve body 100 is formed of a steel pipe or a stainless-steel pipe, thereby reducing the volume and weight and increasing durability.

Further, the valve assembly according to one embodiment of the present invention is not easily broken or deformed in operation due to an increase in tensile strength and water pressure resistance as compared with the conventional valve body made of the cast iron, and is capable of reducing manufacturing costs due to improved workability and a reduced manufacturing time as the valve body can be connected to the inlet pipe and the outlet pipe in a simpler manner such as welding, ring joints, and groove joints.

Meanwhile, the opening and closing unit 200 is disposed in the valve body 100 to open or close a path of the fluid introduced through the inlet portion 101 and discharged through the outlet portion 102.

Here, the opening and closing unit 200 may move in a state of being in close contact with an inner surface of the valve body 100 to open or close the path of the fluid.

That is, the opening and closing unit 200 may open or shield the inlet portion 101 or the outlet portion 102.

As an example, the opening and closing unit 200 may include the stem 210 passing through the shielding member and having one side positioned on an outer side of the valve body 100 and the other side positioned on an inner side of the valve body 100, the disk 220 installed in the stem 210 and slidably moved along a longitudinal direction of the stem 210 to open or shield the inlet portion 101 or the outlet portion 102 in a state in which outer circumferential surface thereof is in close contact with an inner circumferential surface of the inlet portion 101 or the space portion 103, and a spring 230 installed at a circumference of the stem 210 and configured to supply an elastic reaction force to the disk 220 to shield the inlet portion 101 or the outlet portion 102.

The shielding member 250 may include a lid portion 251 which is in close contact with the end portion of the entrance portion 104 and a guide portion 252 which extends from the lid portion 251 to surround an outer circumferential surface of the stem 210.

The guide portion 252 and the stem 210 are formed with screw threads and coupled to each other, and the stem 210 is linearly reciprocated as the handle 240 provided at the other side end portion of the stem 210 is rotated in a clockwise direction or a counterclockwise direction.

Hereinafter, it is assumed that when the handle 240 is rotated in the clockwise direction, the stem 210 is moved toward the inlet portion 101, and when the handle 240 is rotated in the counterclockwise direction, and the stem 210 moves toward the handle 240.

First and second stoppers 261 and 262 are formed to protrude along the outer circumferential surface of the stem 210 to restrict the slide movement of the disk 220.

More specifically, the first stopper 261 is formed at one side end portion of the stem 210, and the second stopper 262 is formed between the disk 220 and the guide portion 252.

Referring to FIGS. 2A to 3B, the operating state of the opening and closing unit 200 will be described below.

First, as shown in FIG. 2A, before the fluid is supplied into the valve body 100 through the inlet portion 101, the disk 220 is in a state of being disposed in the inlet portion 101 and shielding the inlet portion 101.

In addition, as shown in FIG. 2B, when the fluid is transferred to the inlet pipe 300 and the fluid pressure is applied to the inlet portion 101 connected to the inlet pipe 300 so that the disk 220 is moved toward the handle 240, the disk 220 opens the inlet portion 101 as the spring 230 is contracted, so that the fluid may be introduced into the space portion 103.

Diameters d1 and d2 of the inlet portion and/or the space portion in a movement section d3 of the disk 220 are the same, and the moved disk is restricted from being moved by the second stopper 262.

On the other hand, when the applied fluid pressure is released, as shown in FIG. 2A, the disk 220 returns to its original state and shields the inlet portion 101 as the spring 230 expands due to the elastic reaction force, so that not only the fluid is not introduced into the valve body 100 but also the fluid in the space portion 103 is not discharged to the inlet pipe 300 through the inlet portion 101.

Here, the returned disk 220 is restricted from being moved by the first stopper 261. Further, the opening and closing unit 200 may be operated in a manual operation manner or a fully automatic manner.

Referring to FIGS. 3A and 3B, first, in the case of the manual operation manner, before the fluid is supplied into the valve body 100 through the inlet portion 101, when the handle 240 rotates in the clockwise direction with reference to the positions of the first and second stoppers 261 and 262 shown in FIG. 2A, the stem 210 is linearly moved toward the inlet portion 101, and simultaneously the first and second stoppers 261 and 262 formed to protrude from the outer circumferential surface of the stem 210 are moved toward the inlet portion 101 and the disk 220 is moved by the fluid pressure to be brought into close contact with the second stopper 262 as shown in FIG. 3A, thereby reducing an amount of the fluid being introduced into the space portion 103.

In addition, when the handle 240 rotates in the counter-clockwise direction, the stem 210 is linearly moved toward the guide portion 252, and simultaneously the first and second stoppers 261 and 262 formed to protrude from the outer circumferential surface of the stem 210 are moved toward the guide portion 252 and the disk 220 is moved by the fluid pressure to be brought into close contact with the second stopper 262, thereby increasing the amount of the fluid being introduced into the space portion 103.

Further, when the inlet portion 101 or the outlet portion 102 is forcibly shielded before the fluid is supplied into the valve body 100 through the inlet portion 101, as shown in FIG. 3B, the second stopper 262 is brought into close contact with the disk 220 by rotating the handle 240 in the clockwise direction with reference to the positions of the first and second stoppers 261 and 262 shown in FIG. 2A, thereby preventing the disk 220 from being moved by the fluid pressure.

On the other hand, in the case of the fully automatic manner, the opening and closing unit 200 may include electric motion devices such as motors, cylinders, solenoids, and the like, and various sensors such as temperature sensors and pressure sensors, and the like.

Here, the electric motion devices are connected to the various sensors and automatically open or shield the inlet portion 101 or the outlet portion 102 when the temperature or pressure inside or outside the valve body 100, which is sensed by the sensors, exceeds a preset reference value.

Figure 10:
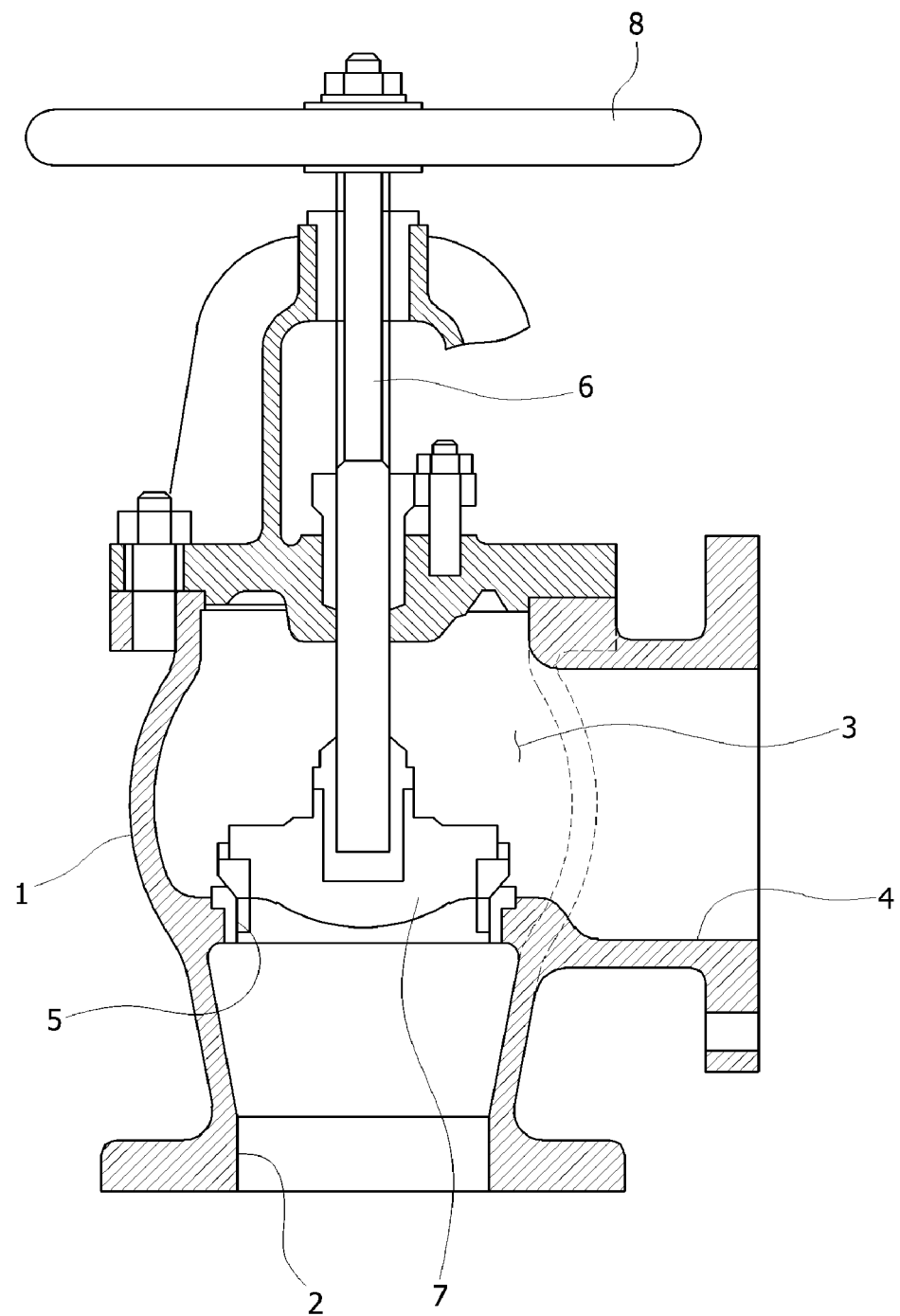
FIG. 10 is a cross-sectional view of a conventional valve.

The conventional valve body made of the cast iron has a surface roughness in the form of a fine concavo-convex shape, and thus the disk 220 is hardly moved in close contact with an inner surface of the valve body 100 as in the present invention. Thus, the conventional valve must form a separate opening 5 which is in close contact with the disk 7 as shown in FIG. 10.

In addition, in a conventional valve body 1, since a space portion 3 is formed to be convex outwardly, a pressure for discharging a fluid to an outlet portion 4 may be lost due to a sudden area expansion of the space portion 3 connected to an inlet portion 2.

However, in the present invention, since the disk 220 is moved in a state of being brought into close contact with the inlet portion 101 and/or the space portion 103, it is not necessary to form a separate opening corresponding to the disk 220, and since the diameters d1 and d2 of the inlet portion 101 and the space portion 103 in the movement section d3 of the disk 220 are the same, an area expansion of the space portion 103 connected to the inlet portion 101 may be smaller than that of the conventional art, thereby reducing a pressure loss of the fluid.

Figure 5:
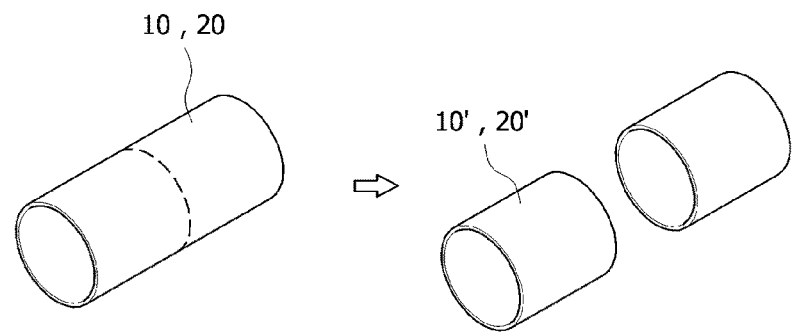
FIG. 5 is a view illustrating a state in which a steel pipe is cut to form a valve body which is a part of the present invention.

FIG. 5 is a view illustrating a state in which a steel pipe is cut to form a valve body which is a part of the present invention.

Referring to FIG. 5, at least one of the inlet pipe 300, the valve body 100, and the outlet pipe 400 is formed by cutting a long steel pipe or a long stainless-steel pipe to a desired length.

As an example, all of the inlet pipe 300, the valve body 100, and the outlet pipe 400 may be formed of a steel pipe 10 or a stainless-steel pipe 20.

Since the steel pipe 10 or the stainless-steel pipe 20 is manufactured with a long length, the length thereof needs to be adjusted when it is intended to be used as the inlet pipe 300, the outlet pipe 400, and the valve body 100. In particular, in the case of the valve body 100, its length should be adjusted to be short.

A steel pipe 10' or a stainless-steel pipe 20' whose length has been adjusted through a cutting process may be used as the inlet pipe 300, the valve body 100 and the outlet pipe 400.

As a reference, the steel pipe 10 or the stainless-steel pipe 20 may be provided with a seamless pipe or a welded steel pipe.

First, the seamless pipe is made by machining the hole after drilling the material or extruding the already pierced material into a press. Representative methods include a Mannesmann piercing process, a centrifugal casting process, an extrusion process, and a drawing process. It is mainly used for special piping, mechanical structure, and heat exchanger applications under high pressure, high temperature, low temperature, corrosive conditions, and the like which may not be used as a welded steel pipe.

Further, the welded steel pipes are made by a method of bending a steel plate and welding a joint, and classified into electric resistance welded steel pipes (ERW steel pipes), gas welded pipes, and submerged arc welded steel pipes (SAW steel pipes) according to a welding method. Further, it may be classified into carbon steel pipes, stainless-steel pipes, galvanized steel pipes, and the like according to the nature of raw materials.

Figure 6:
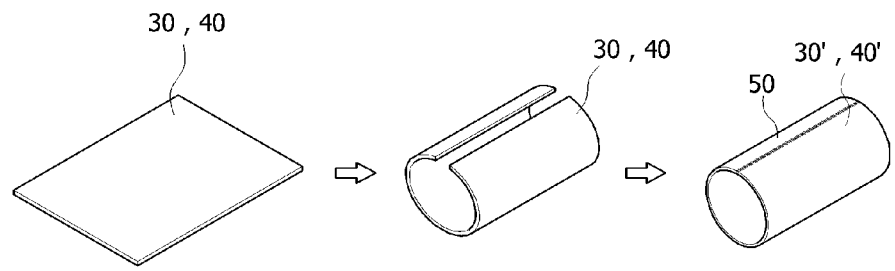
FIG. 6 is a view illustrating a state in which a steel plate is rolled into a cylindrical shape, and a joint thereof is welded to form the valve body which is a part of the present invention.

FIG. 6 is a view illustrating a state in which a steel plate is rolled into a cylindrical shape, and a joint thereof is welded to form the valve body which is a part of the present invention.

Referring to FIG. 6, a least one of the inlet pipe 300, the valve body 100, and the outlet pipe 400 may be formed by rolling a steel plate or a stainless-steel plate into a cylindrical shape and welding the joint.

First, a steel plate 30 or a stainless-steel plate 40 is cut to a desired size. Thereafter, the steel plate 30 or the stainless-steel plate 40 whose size has been adjusted is bent into the cylindrical shape. Thereafter, a welded portion 50 is formed by welding both side end portions of the steel plate 30 or the stainless-steel plate 40, which meet with each other while being bent. As a result, a steel pipe 30' or a stainless-steel pipe 40' may be formed and used as the inlet pipe 300, the valve body 100, and the outlet pipe 400. The finished steel pipe 30' or stainless-steel pipe 40' may be cut to adjust the length thereof if necessary.

Here, the steel pipe 30' or the stainless-steel pipe 40' may be manufactured in various shapes including a square-shaped pipe as well as a cylindrical shaped pipe.

Figure 4:
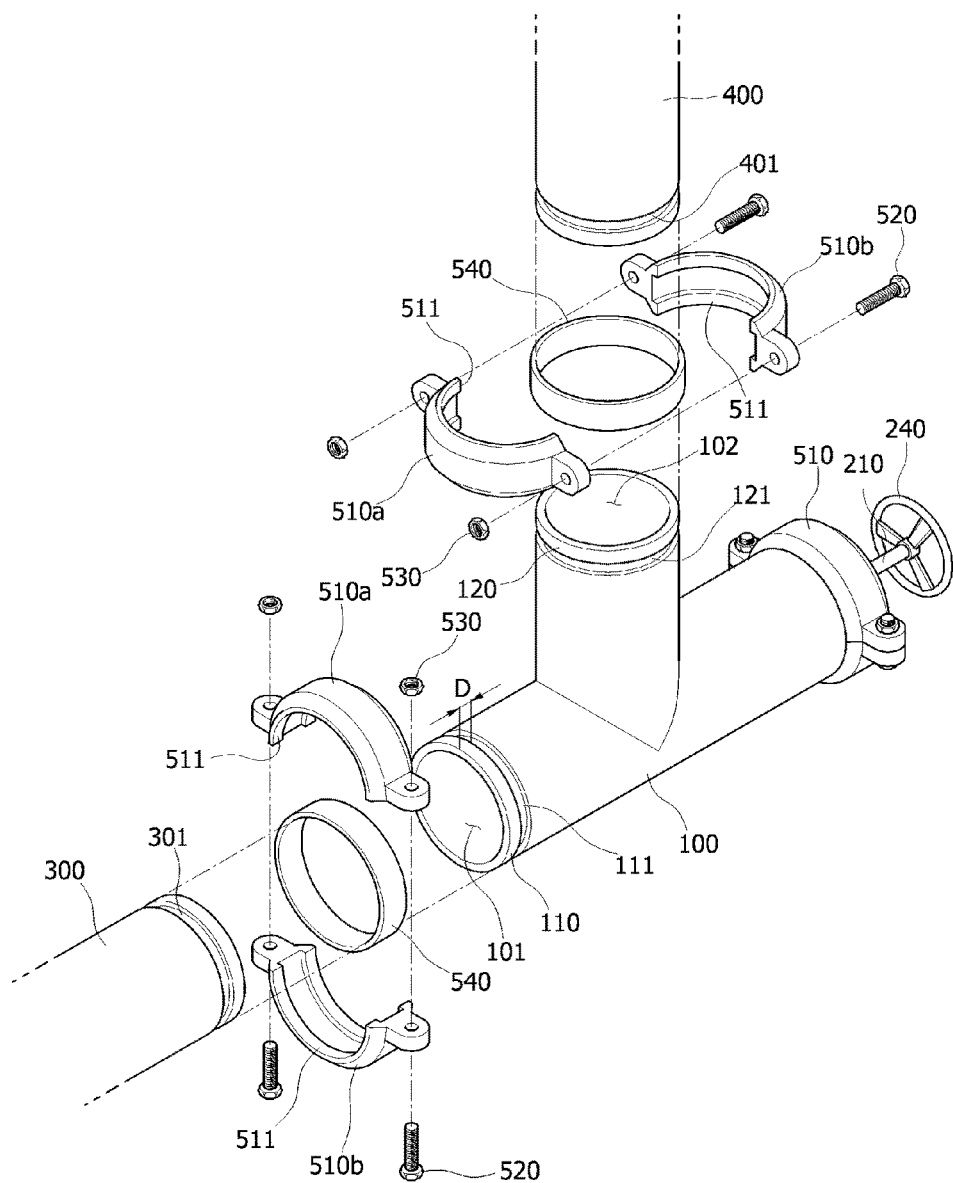
FIG. 4 is an exploded perspective view of the valve assembly according to one embodiment of the present invention.

FIG. 4 is an exploded perspective view of the valve assembly according to one embodiment of the present invention.

Referring to FIG. 4, groove portions 111, 121, 301 and 401 are respectively formed at end portions 110 and 120 of the valve body 100, in which the inlet portion 101 and the outlet portion 102 are formed, and one side end portions of the inlet pipe 300 and the outlet pipe 400, which are connected to the end portions 110 and 120, and are recessed inward along circumferences of the end portions 110 and 120 and the one side end portions. In addition, the valve body 100 is connected to the inlet pipe 300 and the outlet pipe 400 using a joint ring 510 fastened with bolts 520.

Here, the groove portions 111, 121, 301 and 401 may be formed at positions spaced apart from end surfaces of the end portions 110 and 120 of the valve body 100, in which the inlet portion 101 and the outlet portion 102 are formed, and end surfaces of one side end portions of the inlet pipe 300 and the outlet pipe 400, which are connected to the end portions 110 and 120, by a predetermined distance D.

The joint ring 510 is formed by assembling two or more joint ring members 510a and 510b and may include two, three or four members depending on the size thereof. Protrusions 511 are formed on both sides of the joint ring 510 along circumferences thereof to be fitted into each of the groove portions 111, 121, 301 and 401.

The valve body 100 may be connected to the inlet pipe 300 and the outlet pipe 400 by fastening the joint ring members 510a and 510b with the bolts 520 and nuts 530 in a state in which the protrusions 511 are inserted into the groove portions 111, 121, 301 and 401.

When the valve body 100 is connected to the inlet pipe 300 and the outlet pipe 400 through the joint ring 510 as described above, a connection between the valve body 100, and the inlet pipe 300 and the outlet pipe 400 may be easier than anything else, and easily separated if necessary.

Further, even when lengths of the valve body 100, the inlet pipe 300, and the outlet pipe 400 are changed due to a temperature difference, vibration, or the like, the joint ring 510 may absorb this, thereby alleviating a fatigue phenomenon.

Figure 7:
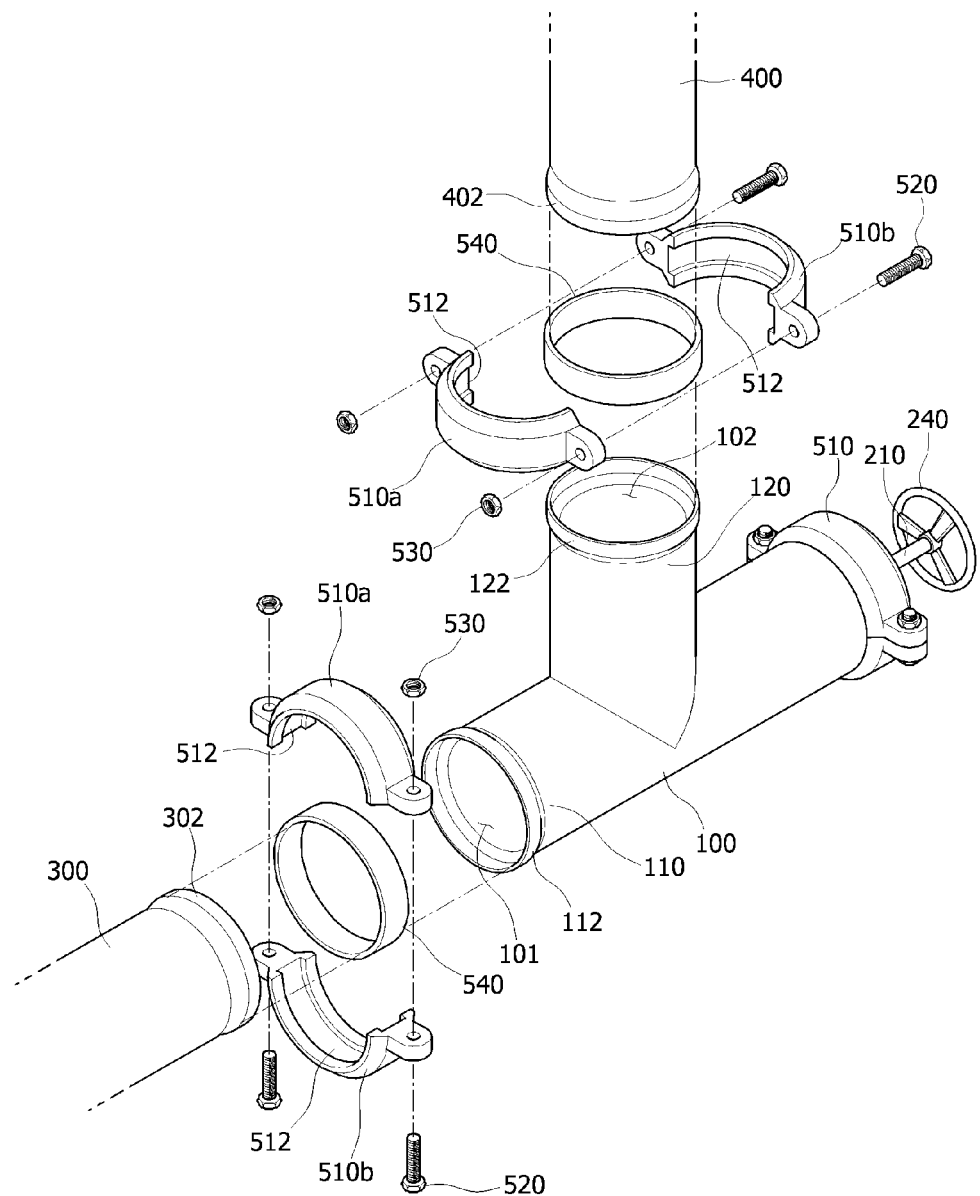
FIG. 7 is an exploded perspective view of a valve assembly according to another embodiment of the present invention.

FIG. 7 is an exploded perspective view of a valve assembly according to another embodiment of the present invention.

Referring to FIG. 7, protrusion portions 112, 122, 302, and 402 are respectively formed at end portions 110 and 120 of a valve body 100, in which an inlet portion 101 and an outlet portion 102 are formed, and one side end portions of an inlet pipe 300 and an outlet pipe 400, which are connected to the end portions 110 and 120, and protrude outward along circumferences of the end portions 110 and 120 and the one side end portions. In addition, the valve body 100 may be fastened to the inlet pipe 300 and the outlet pipe 400 using bolts 520.

As described above, a joint ring 510 is formed by assembling two or more joint ring members 510a and 510b and may include two, three or four members depending on the size thereof. Further, protrusions 511 are formed on both sides of the joint ring 510 along circumferences thereof and protrusion portions 112, 122, 302, and 402 are accommodated between the protrusions 511. In addition, a groove 512 may be formed in the joint ring 510 so that the protrusion portions 112, 122, 302, and 402 are accommodated in center portions of inner surfaces of the joint ring 510.

As described above, the valve body 100 may be connected to the inlet pipe 300 and the outlet pipe 400 by fastening joint ring members 510a and 510b with the bolts 520 and nuts 530 in a state in which the protrusion portions 112, 122, 302, and 402 are accommodated between the protrusions 511.

When the valve body 100 is connected to the inlet pipe 300 and the outlet pipe 400 through the joint ring 510 as described above, a connection between the valve body 100, and the inlet pipe 300 and the outlet pipe 400 may be easier than anything else, and easily separated if necessary. Further, even when lengths of the valve body 100, the inlet pipe 300, and the outlet pipe 400 are changed due to a temperature difference, vibration, or the like, the joint ring 510 may absorb this, thereby alleviating a fatigue phenomenon.

As an example, the protrusion portions 112, 122, 302, and 402 may be formed by extending diameters of the end portions 110 and 120 of the valve body 100, in which the inlet portion 101 and the outlet portion 102 are formed, and one side end portions of the inlet pipe 300 and the outlet pipe 400, which are connected to the end portions 110 and 120. Alternatively, the protrusion portions 112, 122, 302, and 402 may be formed by welding separate ring members to the end portions 110 and 120 of the valve body 100, in which the inlet portion 101 and the outlet portion 102 are formed, and one side end portions of the inlet pipe 300 and the outlet pipe 400, which are connected to the end portions 110 and 120.

Referring again to FIG. 7, a gasket 540 for sealing may be formed between the groove portions 111, 121, 301 and 401 or between the protrusion portions 112, 122, 302, and 402, which are formed in the valve body 100, the inlet pipe 300, and the outlet pipe 400.

As an example, the gasket 540 may be made of an elastic material and have a ring shape.

The gasket 540 may be formed between the groove portions 111 and 301 of the inlet pipe 300 and valve body 100, and between the groove portions 121 and 401 of the outlet pipe 400 and the valve body 100, or between the protrusion portions 112 and 302 of the inlet pipe 300 and the valve body 100 and between the protrusion portions 122 and 402 of the outlet pipe 400 and the valve body 100. Further, the gasket 540 may also be formed between the joint ring 510 and the groove portions 111, 121, 301 and 401, or between the joint ring 510 and the protrusion portions 112, 122, 302, and 402.

Through such a configuration using the gasket 540, airtightness may be maintained between the valve body 100, and the inlet pipe 300 and the outlet pipe 400, which are connected through the joint ring 510.

Figure 8:
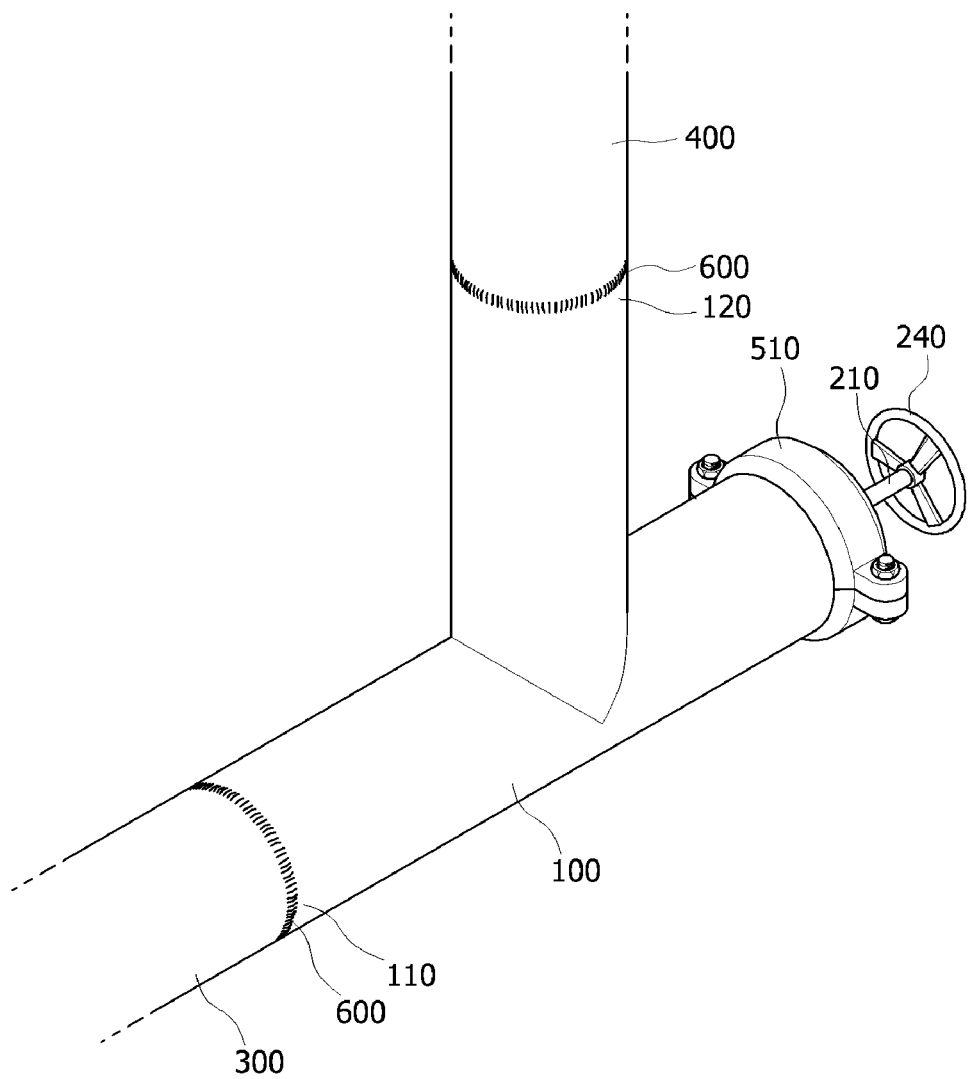
FIGS. 8 and 9 are perspective views of a valve assembly according to still another embodiment of the present invention.
Figure 9:
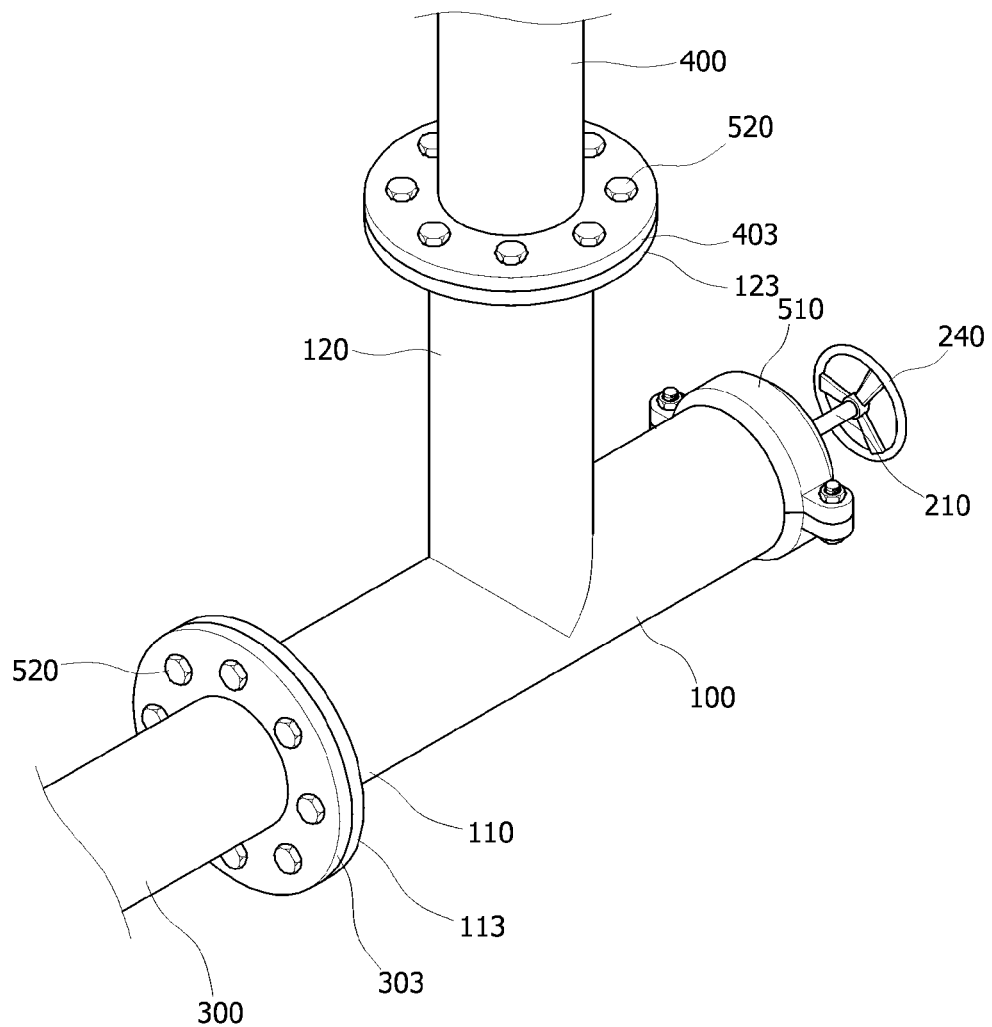

FIGS. 8 to 9 are perspective views of a valve assembly according to still another embodiment of the present invention.

Referring to FIG. 8, end portions 110 and 120 of a valve body 100, in which an inlet portion 101 and an outlet portion 102 are formed, and one side end portions of an inlet pipe 300 and an outlet pipe 400, which are connected to the end portions 110 and 120, may be connected by welding.

In the conventional case, the valve body 100 is made of cast iron and may not be welded to the inlet pipe 300 and the outlet pipe 400, which are made of a steel pipe.

However, in the case of the present invention, since the valve body 100, the inlet pipe 300, and the outlet pipe 400 are all made of a steel pipe or a stainless-steel pipe, the welding portion 600 may be formed by welding connection parts of the valve body 100, and the inlet and outlet pipes 300 and 400, thereby easily connecting the valve body 100 to the inlet pipe 300 and the outlet pipe 400.

Referring to FIG. 9, flanges 113, 123, 303, and 403 are respectively formed at the end portions 110 and 120 of the valve body 100, in which the inlet portion 101 and the outlet portion 102 are formed, and one side end portions of the inlet pipe 300 and the outlet pipe 400, which are connected to the end portions 110 and 120, and the valve body 100 and the inlet and outlet pipes 300 and 400 are connected to each other by fastening the flanges 113, 123, 303, and 403 using bolts 520 and nuts 530.

The flanges 113, 123, 303, and 403 may be fixed to the end portions 110 and 120 of the valve body 100, in which the inlet portion 101 and the outlet portion 102 are formed, and one side end portions of the inlet pipe 300 and the outlet pipe 400, which are connected to the end portions 110 and 120, by welding.

When the flanges 113 and 303 of the inlet pipe 300 and the valve body 100 are disposed to be in contact with each other, and the flanges 123 and 403 of the outlet pipe 400 and the valve body 100 are disposed to be in contact with each other, and through holes formed in the flanges 113, 123, 303, and 403 are fastened with the bolts 520 and the nuts 530, the valve body 100 may be connected to the inlet pipe 300 and the outlet pipe 400.

According to the valve assembly of one embodiment of the present invention, the valve body is made of the steel pipe or the stainless-steel pipe, so that the valve body may have reduced volume and weight and improved durability, may be not easily broken or deformed in operation due to an increase in tensile strength and water pressure resistance as compared with the conventional valve body made of cast iron, and may reduce manufacturing costs due to improved workability and a reduced manufacturing time as the valve body is connected to the inlet pipe and the outlet pipe in a simpler manner such as welding, joint rings, or the like.

The embodiments of the present invention have been described above. However, it should be noted that the spirit of the present invention is not limited to the embodiments in the specification and those skilled in the art and understanding the present invention may easily suggest other embodiments by addition, modification, and removal of the components within the same spirit, but those are construed as being included in the spirit of the present invention.

The invention claimed is:

1. A valve assembly installed between an inlet pipe and an outlet pipe through which a fluid is transferred, the valve assembly comprising:
   a valve body in which an inlet portion, a space portion, and an outlet portion are formed, wherein the inlet portion is connected to the inlet pipe and the fluid is introduced through the inlet portion, the fluid supplied to an inside of the valve body through the inlet portion stays in the space portion, and the outlet portion is connected to the outlet pipe and the fluid of the space portion is discharged to the outside through the outlet portion; and
   an opening and closing unit configured to open or close a path of the fluid by moving in a state of being in close contact with an inner surface of the valve body,
   wherein the valve body is formed of a pipe of a steel or stainless-steel material,
   wherein the valve body is formed with an entrance portion in which the opening and closing unit is installed,
   wherein the valve body includes the inlet portion formed at one side thereof, the entrance portion formed at the other side thereof, and the space portion formed between the inlet portion and the entrance portion, and the inlet portion, the space portion, and the entrance portion are disposed in a straight line,
   wherein the opening and closing unit includes:
   a stem passing through a shielding member installed at the entrance portion;
   a disk installed in the stem and slidably moving along a longitudinal direction of the stem in a state in which an outer circumferential surface thereof is in close contact with an inner circumferential surface of the inlet portion or the space portion;
   a first and second stoppers formed to protrude along the outer circumferential surface of the stem to restrict the slide movement of the disk; and
   a handle moving the stem to move the positions of the first and second stoppers,
   wherein the stem is arranged in a straight line of the inlet portion, the space portion and the entrance portion,
   wherein diameters of the inlet portion and the space portion are the same in a movement section of the disk,
   wherein the disc is placed in close contact with the inner circumferential surface of the inlet portion to close the path of the fluid,
   wherein the first stopper is formed at one side end portion of the stem, and
   wherein the second stopper is formed between the disk and the shielding member.

2. The valve assembly of claim 1, wherein at least one of the inlet pipe, the valve body, and the outlet pipe is formed by cutting a steel pipe or a stainless-steel pipe.

3. The valve assembly of claim 1, wherein at least one of the inlet pipe, the valve body, the outlet pipe is formed by rolling a steel plate or a stainless-steel plate into a cylindrical shape and welding a joint thereof.

4. The valve assembly of claim 1, wherein: groove portions are respectively formed at end portions of the valve body, in which the inlet portion and the outlet portion are formed and one side end portions of the inlet pipe and the outlet pipe, and are recessed inward along circumferences of the end portions and the one side end portions; and the valve body is connected to the inlet pipe and the outlet pipe using a joint ring fastened with bolts.

5. The valve assembly of claim 4, wherein a gasket for sealing is formed between the groove portions, which are formed in the valve body, the inlet pipe, and the outlet pipe.

6. The valve assembly of claim 1, wherein: protrusion portions are respectively formed at end portions of the valve body, in which the inlet portion and the outlet portion are formed and one side end portions of the inlet pipe and the outlet pipe, and protrude outward along circumferences of the end portions and the one side end portions; and the valve body is connected to the inlet pipe and the outlet pipe using a joint ring fastened with bolts.

7. The valve assembly of claim 6, wherein a gasket for sealing is formed between the protrusion portions, which are formed in the valve body, the inlet pipe, and the outlet pipe.

8. The valve assembly of claim 1, wherein each end portion of the valve body, in which the inlet portion and the outlet portion are formed, is connected to the inlet pipe and the outlet pipe by welding.

9. The valve assembly of claim 1, wherein flanges are respectively formed at end portions of the valve body, in which the inlet portion and the outlet portion are formed, and the inlet pipe and the outlet pipe, and the valve body and the inlet and outlet pipes are connected to each other by fastening the flanges using bolts.

* * * * *